(12) United States Patent
Ziemann et al.

(10) Patent No.: US 9,688,180 B2
(45) Date of Patent: Jun. 27, 2017

(54) TRAILER FOR A TUGGER TRAIN

(71) Applicant: Jungheinrich Aktiengesellschaft, Hamburg (DE)

(72) Inventors: Jorg Ziemann, Hamburg (DE); Arne Kraase, Lüneburg (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 126 days.

(21) Appl. No.: 14/640,681

(22) Filed: Mar. 6, 2015

(65) Prior Publication Data

US 2015/0251583 A1    Sep. 10, 2015

(51) Int. Cl.
| | |
|---|---|
| *B60P 3/07* | (2006.01) |
| *B60P 1/02* | (2006.01) |
| *B62D 63/06* | (2006.01) |
| *B62D 53/00* | (2006.01) |

(52) U.S. Cl.
CPC ...... *B60P 3/07* (2013.01); *B60P 1/02* (2013.01); *B62D 53/005* (2013.01); *B62D 63/062* (2013.01)

(58) Field of Classification Search
CPC .......... B60D 1/481; B60D 1/483; B60D 1/52; B60D 2001/005; B62B 3/00; B62D 53/005; B62D 63/06

USPC ...... 280/203, 204, 302, 406.2, 407.1, 416.2, 280/423.1

See application file for complete search history.

(56) References Cited

U.S. PATENT DOCUMENTS

| | | | | |
|---|---|---|---|---|
| 7,185,911 B1 * | 3/2007 | Leverett | .................. | B60D 1/481 |
| | | | | 280/47.371 |
| 8,302,975 B2 * | 11/2012 | Hergeth | .................... | B62B 3/04 |
| | | | | 280/47.19 |
| 8,851,488 B2 * | 10/2014 | Carruyo | .................... | B60P 7/08 |
| | | | | 280/656 |
| 8,925,951 B2 * | 1/2015 | Bartlett | .................. | B62D 63/06 |
| | | | | 280/414.5 |
| 9,205,746 B2 * | 12/2015 | Sekine | .................. | B60L 3/0061 |
| 9,290,214 B2 * | 3/2016 | Badura | .................. | B62D 53/00 |

FOREIGN PATENT DOCUMENTS

| | | |
|---|---|---|
| DE | 10 2012 024 929 A1 | 6/2014 |
| EP | 2 660 131 B1 | 11/2014 |
| WO | 2014/187581 A1 | 11/2014 |

* cited by examiner

*Primary Examiner* — Toan To
(74) *Attorney, Agent, or Firm* — Young Basile Hanlon & MacFarlane, P.C.

(57) ABSTRACT

A trailer for a tugger train has a frame, which in the tow direction has a drawbar and a coupling, and which transverse to the tow direction has a laterally open receiving space for an inner wagon to be transported. A central web is arranged in the receiving space. The frame has connection means in each case for drawbar and coupling, and the frame has connection means for the central web for the releasable connection of the frame and connection means.

19 Claims, 3 Drawing Sheets

TRAILER FOR A TUGGER TRAIN

CROSS-REFERENCE TO RELATED APPLICATION

This application claims priority to German Patent Application No. DE 10 2014 002 974.3, filed Mar. 6, 2014, the content of which is incorporated herein in its entirety by reference.

TECHNICAL FIELD

The present invention relates to a trailer for a tugger train.

BACKGROUND

Tugger trains are used for transporting materials in the scope of in-plant logistics and intralogistics. A tugger train is typically comprised of one or more towing vehicles, which tow a train of trailers that are coupled together. Each trailer can, depending on the design, receive one or more inner wagons to be transported.

With the design of the trailer for a tugger train, there is a fundamental distinction between portal trailers, with which the inner wagon to be transported can be pushed in from both sides, and frame-based trailers, which can receive an inner wagon to be transported only from one side. There, the inner wagon does not have be a wagon located completely within the trailer. The inner wagon can also extend laterally beyond the trailer, and be thusly transported with the trailer. Any load-bearing unit that is suitable for transporting on a trailer and can be moved preferably on wheels or rollers is considered as an inner wagon.

With the trailers for tugger trains, along with the distinction with regard to receiving the inner wagon, there is also the distinction of whether the inner wagon with the rollers or wheels thereof is clear of the floor during transport. Fundamentally, tugger trains are known with which the towed inner wagons themselves roll and are guided in the trailer. Alternatively, trailers are also known with which the inner wagon is raised and the wheels of the inner wagon are clear of the floor during transport such that the inner wagon is carried.

SUMMARY

With trailers having frames that can be loaded from one side, which allow transporting the inner wagon in the raised state, manufacturing has proven to be relatively complicated. This is particularly true with respect to customer-specific requests. The trailer is comprised of a frame and a central web, upon which, or on which, the inner wagon can be transported.

A trailer for a tugger train that can be easily and flexibly designed even in the case of customer-specific requirements is desirable.

The trailer according to implementations of the invention is designed and intended for a tugger train or a tow train, which are used in intralogistics. The trailer has a frame, which in the longitudinal direction relative to the tow direction thereof, has a drawbar and a coupling. The trailer can be attached to a towing vehicle using the drawbar. A towed trailer can be towed by the towing vehicle using the coupling. The reverse arrangement of the coupling and drawbar is also possible. The frame, transverse to the tow direction, has a laterally open receiving space for an inner wagon to be transported. A central web is arranged in the receiving space. According to an implementation of the invention, the frame is equipped with a first connection means in each case for the drawbar and coupling. The frame may also be equipped with second connection means for the central web. The second connection means is designed such that a releasable connection can be established between the central web and the frame. The distinction between first and second connection means relates only to the use of the connection means on the trailer, and does not imply that the first and second connection means are different from each other. Moreover, the first and second connection means can be identical in design, but be positioned at different positions of the frame.

In some designs, the connection means for the frame and central web has a screw connection and/or a bolt connection. Using a screw connection and/or bolt connection, a releasable connection can be produced between the frame and central web that, depending on the intended operation or use of the trailer, allows a central web of the desired design and configuration to be connected to a frame of the desired design and configuration.

In some designs, the connection means for the frame and central web is designed such that a form-locking, force-fitting and/or friction-fitting connection can be produced between the frame and central web. In particular, by combining different connections a sufficiently stable connection can be produced for accommodating loads.

In a further design, the connection means for the frame and the drawbar as well as the coupling are designed for producing a releasable connection. This facilitates the assembly of a trailer having the desired properties with regard to the drawbar and coupling.

The trailer according to the teachings herein may be comprised of three assemblies or components that are releasably connected together. This allows a trailer to be very flexibly configured according to customer-specific requests. Depending on the request, suitable drawbars and couplings can be connected to the frame. Likewise, a suitably designed central web can be connected to the frame.

In some designs, the frame is substantially U-shaped. Here, the limbs of the U may form the sites to which the drawbar and coupling can be attached to the frame.

In some designs, the central web is provided with an undercarriage. The undercarriage of the central web is preferably the only undercarriage of the trailer where it is present, but this is not required.

For directionally stable handling of the trailer, the central web may be designed centrally on the U-shaped frame or centrally between the coupling points of drawbar and coupling. Depending on the design of the drawbar and coupling, the coupling points of the drawbar and coupling are generally also the points at which a pivoting occurs with respect to the towed or towing vehicle.

In some designs, the frame and central web are designed as two separate components that are releasably connected together using a mounting flange serving as a connection means. It is also possible that both central web and also frame each have a mounting flange, which flanges are connected together. They may be connected together by lying them flat on top of each other and, for example, screwing them together.

In designs where the central web is fastened sunken on the frame, the frame also laterally delimits the receiving space that is delimited downward by the top side of the central web. In a feasible design, the frame has on its bottom side the mounting flange for the face-side fastening of the central web, such that the receiving space is delimited on at least three sides by the frame and downward by the central web. Alternatively or additionally, the central web can have a face-side mounting flange for fastening to the frame, wherein the receiving space is again delimited on at least three sides by the frame and downward by the central web. The height offset between the central web and the U-shaped frame is especially suited for providing a suitable flange as a connection means for a screw connection or bolt connection. This is because a mounting flange projecting in this manner has the particular advantage of an easily accessible assembly to the frame.

In some designs, a mounting flange is provided in each case on the frame in the tow direction as a connection means for the drawbar and for the coupling. Alternatively or at the same time, the drawbar and coupling can have a mounting flange at the frame-side ends thereof as a fastening means.

In some designs, the central web is equipped laterally with two ramps upon which the inner wagon to be transported can be pushed in order to be cleared of the floor. Alternatively or additionally, the central web can also be provided with a lifting apparatus that raises an inner wagon to be transported.

The advantages of the teachings herein are particularly significant for a set of trailers where the set has at least one frame and a plurality of central webs that can be releasably connected to the frame and any frame with any central web can be connected to the trailer. Here, a plurality of frames and a plurality of central webs refer to the fact that a plurality of frames may be available having a different design or a different frame type, and also the mountable central webs differ in shape, form, function and/or configuration. With this set, a trailer can be configured by a user according to user requirements without reconstruction or great effort.

In a further design, a plurality of frames may be provided with the set such that the frames differ from each other in frame strength and/or frame height. Depending on the intended use, the frames can be designed having different strength and/or height. Likewise, it is also possible to implement the central webs with or without rollers. In such cases, the frames may be correspondingly modified in the undercarriage. Fundamentally, it is also possible that the frames are equipped with different undercarriages. For example, one or more frames in the set can be equipped with four casters, preferably in the corners of the frame. The central web can be equipped, for example, with two fixed casters, or only with one centrally arranged fixed caster. The fixed casters can also be spring-mounted, for example, in order to ensure a good positioning of the trailer on the ground. In an alternative design, the rollers on the central web can also be equipped with a drive. With a three- or four-wheel undercarriage on the frame it is possible to design the central web also without rollers, wherein then the frame is equipped with steered casters. For the sets of frames and central webs, it is also possible to provide different frame lengths, which are equipped for receiving one or more inner wagons or pallets. Here, it is also possible to equip the frames with more than one central web for supporting the inner wagon.

BRIEF DESCRIPTION OF THE DRAWINGS

A design of the trailer according to implementations of the invention is explained in greater detail below with reference to the drawings in which:

FIG. 1 is a perspective view of a trailer according to the teachings herein with the inner wagon pushed in;

FIG. 2 is a perspective view of the trailer from FIG. 1 without the inner wagon pushed in;

DETAILED DESCRIPTION

Figure 1:
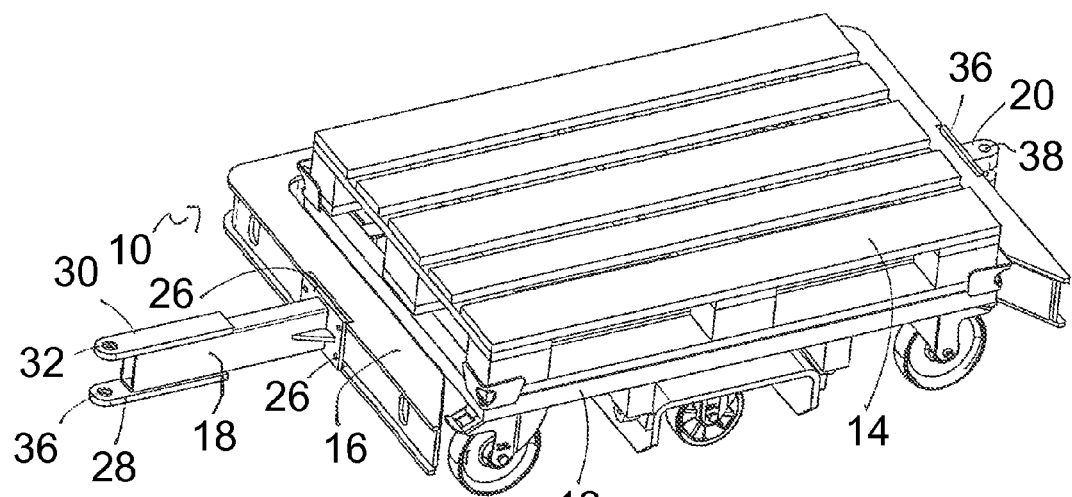

FIG. 1 shows a trailer 10 according to embodiments of the invention described herein in which an inner wagon 12 with an accommodated pallet 14 is pushed in. The trailer 10 has a U-shape frame 16 having drawbar 18 on one side and a trailer coupling 20 on the opposing side. The drawbar 18 is comprised of a rigid drawbar arm 22, which is designed as a rectangular hollow profile. The end of the drawbar arm 22 pointing toward the trailer has a flange plate 24, which has a bore hole 26 in each of the corners thereof. The opposite end of the drawbar arm 22 is delimited by two limb plates 28, 30. The limb plates 28, 30 have bore holes 32, 34 aligned with each other. The drawbar 18 is fastened rigidly to the frame 16 using the flange plate 24. For this purpose, mounting bolts can be guided through the bore hole 26 and a corresponding frame bore hole (not shown). It is also possible, alternatively or additionally, to weld the flange plate 24 to the frame 16. As seen in FIG. 1, the connection of the coupling 20 is substantially similar to the connection of the drawbar 22 to the frame. The coupling 20 also has a flange plate 36, with which the coupling 20 is fastened to the frame 16. The coupling 20 also has a continuous coupling bore hole 38 for receiving a coupling pin (not shown).

Figure 2:
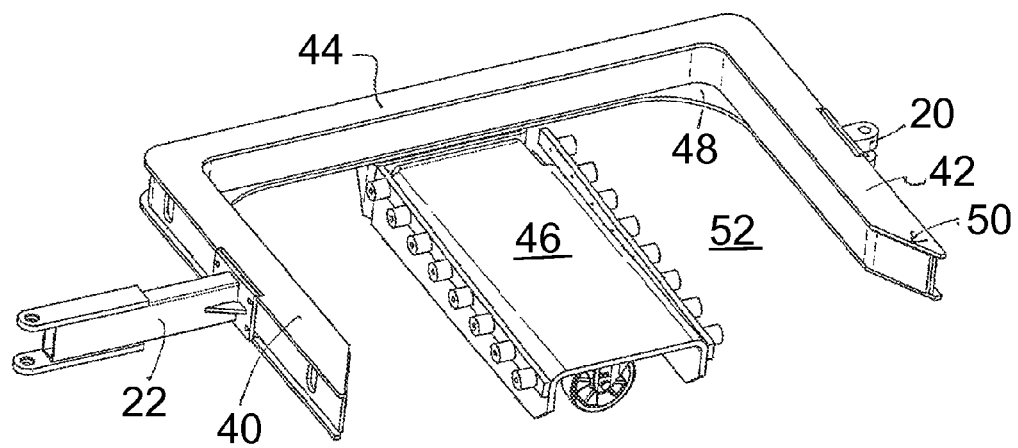

The substantially U-shaped frame 16 is comprised of three profile limbs 40, 42, 44, each of which is formed having a double T-shape. Other profile shapes, such as rectangular profiles, are also possible. As shown in FIG. 2, the limb 40 supports the drawbar 22, the limb 42 supports the coupling 20, and the limb 44 supports a central web 46. The transitions between the limbs 42 and 44 as well as the limbs 40 and 44 are provided with rounded reinforced corners 48 in order guide the tractive forces acting on the frame 16 from coupling 20 to the drawbar 22. The receiving space 52, in which the central web 46 projects, is located between the limbs 40 and 42. Laterally of the receiving space 52, the limbs 42 and 40 have a chamfer 50, which facilitates the pushing of the inner wagon 12 into the inner space 52.

Figure 3:
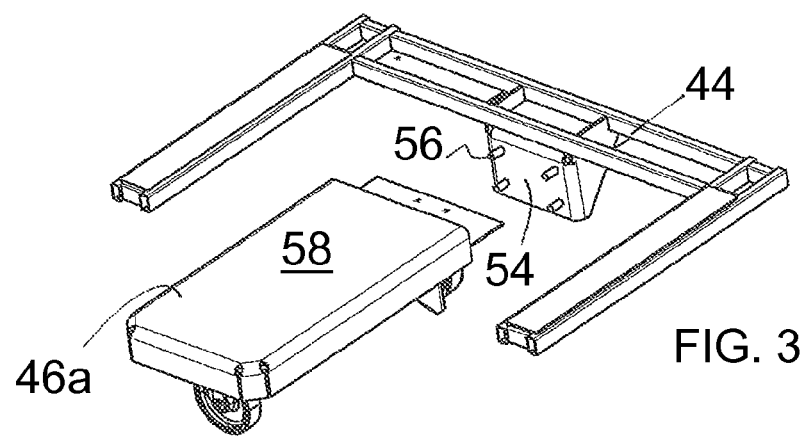
FIG. 3 is a perspective view of an assembly of a trailer according to the teachings herein with central web to be attached and a lifting apparatus.
Figure 4:
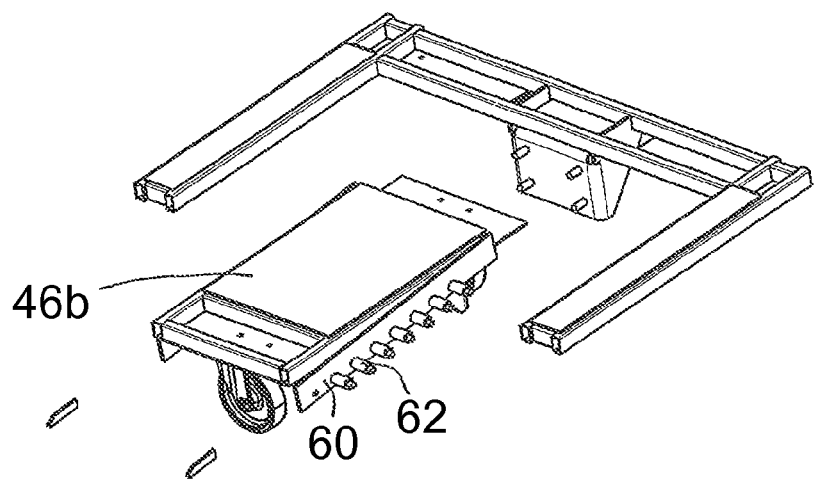
FIG. 4 is a perspective view of an attachment of a central web with a ramp-shaped slide-on aid laterally on the central web.

FIGS. 3 and 4 show a mounting flange 54 that is attached to the connecting limb 44. The mounting flange 54 is substantially perpendicular to the plane spanned by the limbs 40, 42, 44 of the U-shaped frame 16. Bolt ends 56, which permit the mounting of a central web 46a, project from the mounting flange 54. The central web 46a is covered by an integral metal sheet 58. A lifting apparatus can be arranged beneath the metal sheet 58 so that an inner wagon 12 pushed into the trailer frame 16 can be raised using the lifting apparatus. FIG. 4 shows an alternative design of the trailer 10 having a central web 46b, which has a respective ramp 60 on opposing sides thereof. Rotatably mounted roller bodies 62 project laterally from the ramps 60. An inner wagon 12 to be transported is pushed over the ramps 60 with the roller bodies 62 thereof into a raised position, where the wagon 12 can be secured for transport.

Figure 5:
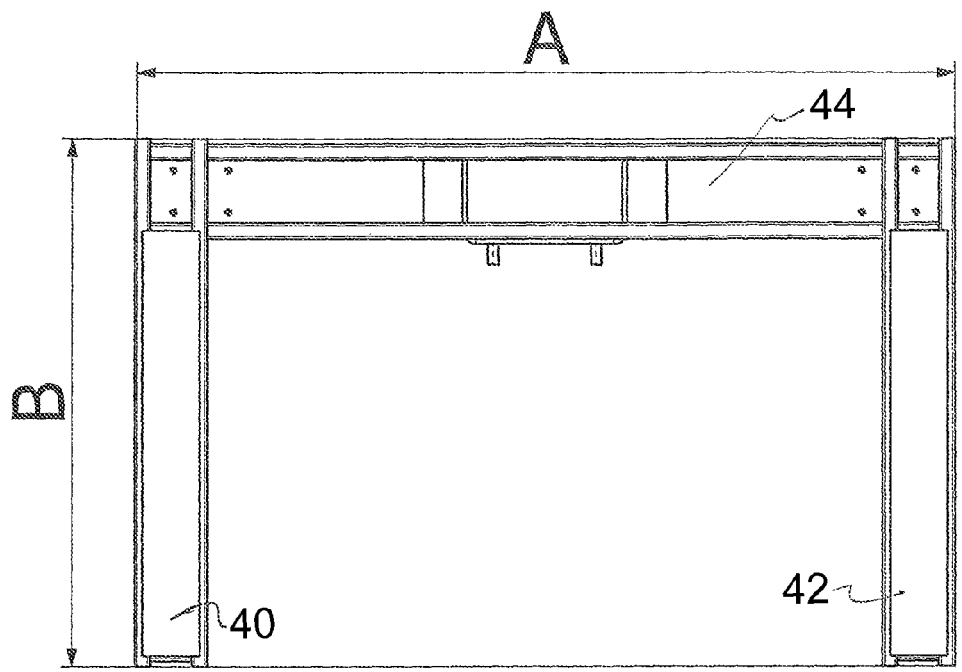
FIG. 5 is a top view of a trailer frame.
Figure 6:
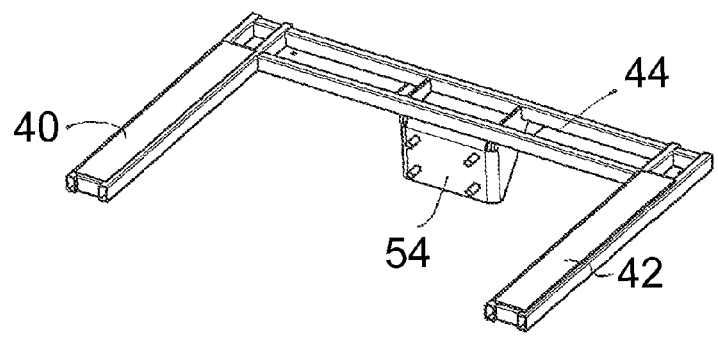
FIG. 6 is a side perspective view of a trailer frame with flange.

FIGS. 5 and 6 show the frame 16 with a mounting flange 54. The mounting flange 54 is attached centrally to the limb 44 by, for example, welding. Depending on customer requests, specific additions for the drawbar and trailer coupling, as well as for the central web, can be attached without great effort to the frames shown in FIGS. 5 and 6. In this manner, a modular frame trailer arises that is comprised of a plurality of modules and functional groups having defined interfaces, which are pre-manufactured independently of each other and largely independent of customer orders. The central web can be equipped, for example, with rollers for light-weight goods, and manual pushing in and lifting onto the central web. In addition, chamfered roller tracks can be provided as an inclined plane for manual operation. If a lifting unit is used, a hydraulic, pneumatic or electrical lifting unit can be provided here. In addition, central webs with special slim-designed lifting units, or two divided lifting units, are also possible.

Likewise, different designs can be provided with regard to the combination of the drawbar and drawbar coupling. Thus, it is possible for example to provide a center-pivoting drawbar designed rigid with respect to moments in the vertical direction. Also, drawbars that are vertically movable and/or adjustable in height can be provided. In addition, drawbars that are particularly long and thin can be attached to the frame.

With the central web, different shapes of undercarriages are also possible. Thus, an undercarriage having nylon rollers with thin small diameter, and having Vulkollan® rollers with a large diameter can be provided. Also, depending on the inner wagons being used, undercarriages having different heights can be used. Basically, even undercarriages with springs are possible for outdoor use.

With the trailer according to the teachings herein, it is possible to pre-mount all of the aforementioned components for the central web, the undercarriage thereof, and the drawbar, to stockpile them, and to assemble them according to specific orders.

What is claimed is:

1. A trailer for a tugger train, comprising:
a frame, which in the tow direction has a drawbar and a coupling, and which transverse to the tow direction has a laterally open receiving space for an inner wagon to be transported; and
a central web arranged in the receiving space, wherein the frame has a first connector that connects the drawbar and the coupling and a second connector for the central web that releasably connects the frame and the central web,
wherein each of the first connector and the second connector is designed such that at least one of a form-locking, a force-fitting or a friction-fitting connection exists between the frame and the central web.

2. The trailer according to claim 1, wherein the first connector forms a releasable connection for the drawbar and the coupling.

3. The trailer according to claim 1, wherein the frame is substantially U-shaped.

4. The trailer according to claim 3, wherein the central web is arranged centrally on the U-shaped frame or between coupling points of the drawbar and the coupling.

5. The trailer according to claim 1, wherein the central web has an undercarriage.

6. The trailer according to claim 1, wherein the frame and the central web are designed as two separate components that are connected together using a mounting flange.

7. The trailer according to claim 6, wherein the frame at a bottom side thereof has the mounting flange for face-side attachment of the central web such that the receiving space is delimited at least on three sides by the frame, and downward by the central web.

8. The trailer according to claim 6, wherein the central web has the mounting flange on a face-side for attaching to the frame, wherein the receiving space is delimited at least on three sides by the frame, and downward by the central web.

9. The trailer according to claim 1, wherein a mounting flange is provided on the frame in a tow direction as the first connector for the drawbar and the coupling.

10. The trailer according to claim 1, wherein the drawbar and the coupling each have, on frame-side ends thereof, a mounting flange as the first connector.

11. The trailer according to claim 1, wherein the central web has a lifting apparatus.

12. A trailer for a tugger train, comprising:
a frame, which in the tow direction has a drawbar and a coupling, and which transverse to the tow direction has a laterally open receiving space for an inner wagon to be transported; and
a central web arranged in the receiving space, wherein the frame has a first connector that connects the drawbar and the coupling and a second connector for the central web that releasably connects the frame and the central web,
wherein, on each side of the central web, a ramp is provided upon which the inner wagon can be pushed.

13. The trailer according to claim 12, wherein each of the first connector and the second connector is at least one of a screw connection or a bolt connection.

14. The trailer according to claim 12, wherein each of the first connector and the second connector is designed such that at least one of a form-locking, a force-fitting or a friction-fitting connection exists between the frame and the central web.

15. A trailer for a tugger train, comprising:
a frame, which in the tow direction has a drawbar and a coupling, and which transverse to the tow direction has a laterally open receiving space for an inner wagon to be transported; and
a central web arranged in the receiving space, wherein the frame has a first connector that connects the drawbar and the coupling and a second connector for the central web that releasably connects the frame and the central web,
wherein the central web is one of a plurality of central webs releasably connected to the frame, wherein the frame is releasably connected to the trailer with any of the central webs.

16. The trailer according to claim 15, wherein the frame is one of a plurality of frames for a set of trailers that differ in at least one of a frame strength thereof or a frame height thereof.

17. The trailer according to claim 15, each central web of the plurality of central webs is implemented with or without rollers.

18. The trailer according to claim 15, wherein the frame is one of a plurality of frames for a set of trailers, each frame differing in an undercarriage thereof.

19. The trailer according to claim 15, wherein each of the first connector and the second connector is designed such that at least one of a form-locking, a force-fitting or a friction-fitting connection exists between the frame and the central web.

* * * * *